Figure 1:
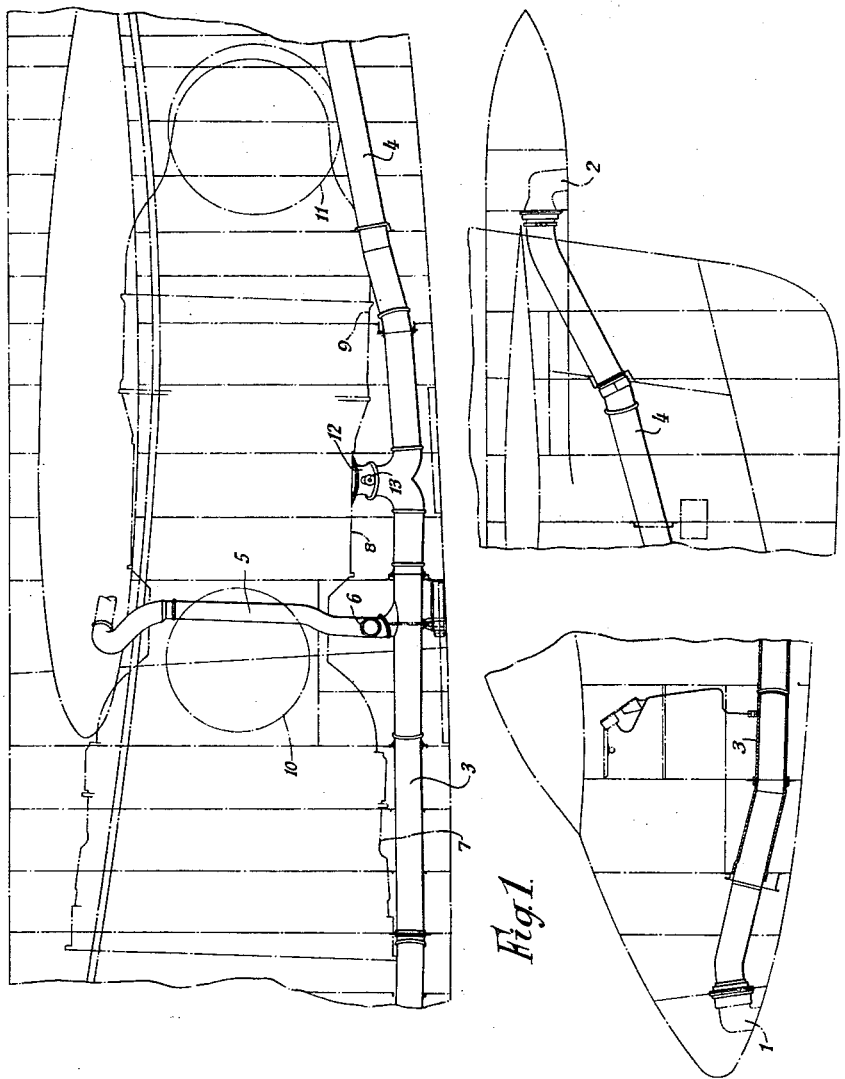

Nov. 19, 1963  M. L. MURPHY  3,111,289
STABILIZING CONTROL NOZZLE SYSTEMS FOR USE ON AIRCRAFT
Filed Jan. 23, 1961  7 Sheets-Sheet 1

INVENTOR
Matthew Lee Murphy
BY
Stevens Davis Miller & Mosher
ATTORNEYS

Nov. 19, 1963  M. L. MURPHY  3,111,289
STABILIZING CONTROL NOZZLE SYSTEMS FOR USE ON AIRCRAFT
Filed Jan. 23, 1961  7 Sheets-Sheet 3

INVENTOR
Matthew Lee Murphy
BY
Stevens Davis Miller & Mosher
ATTORNEY

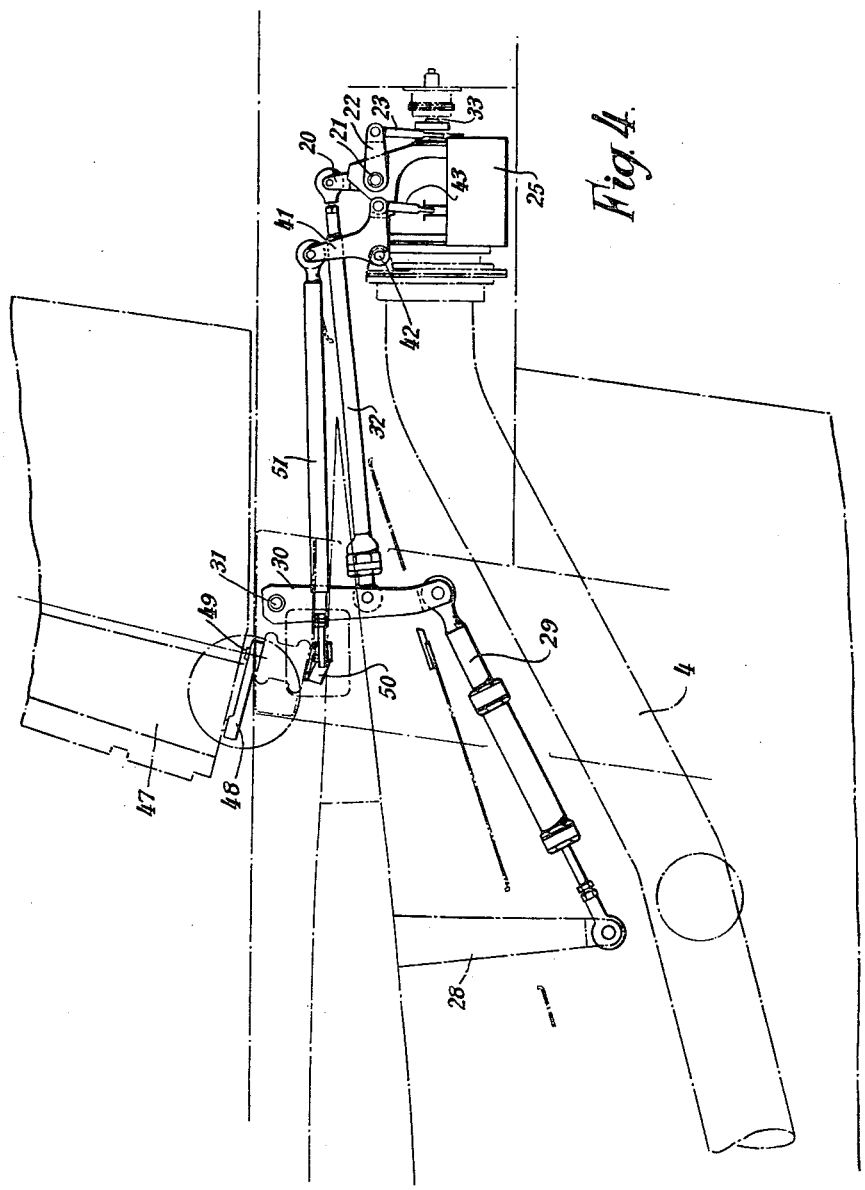

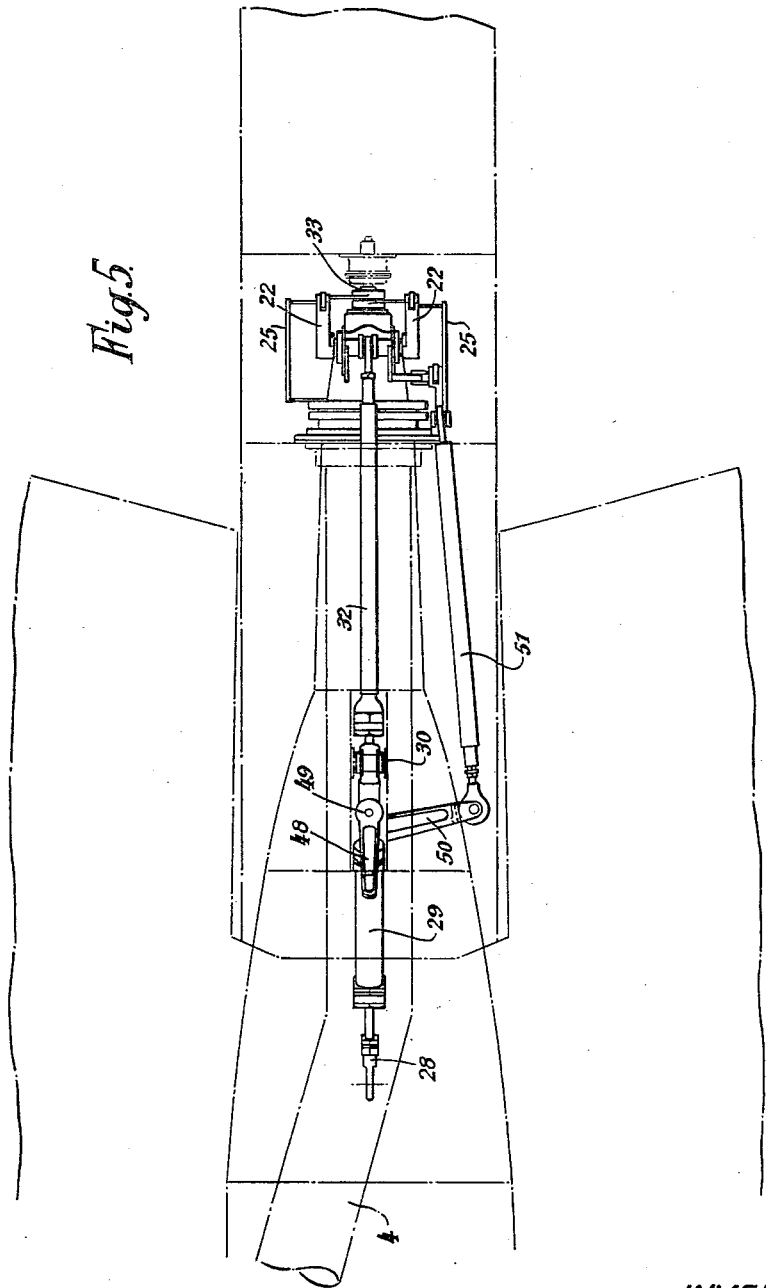

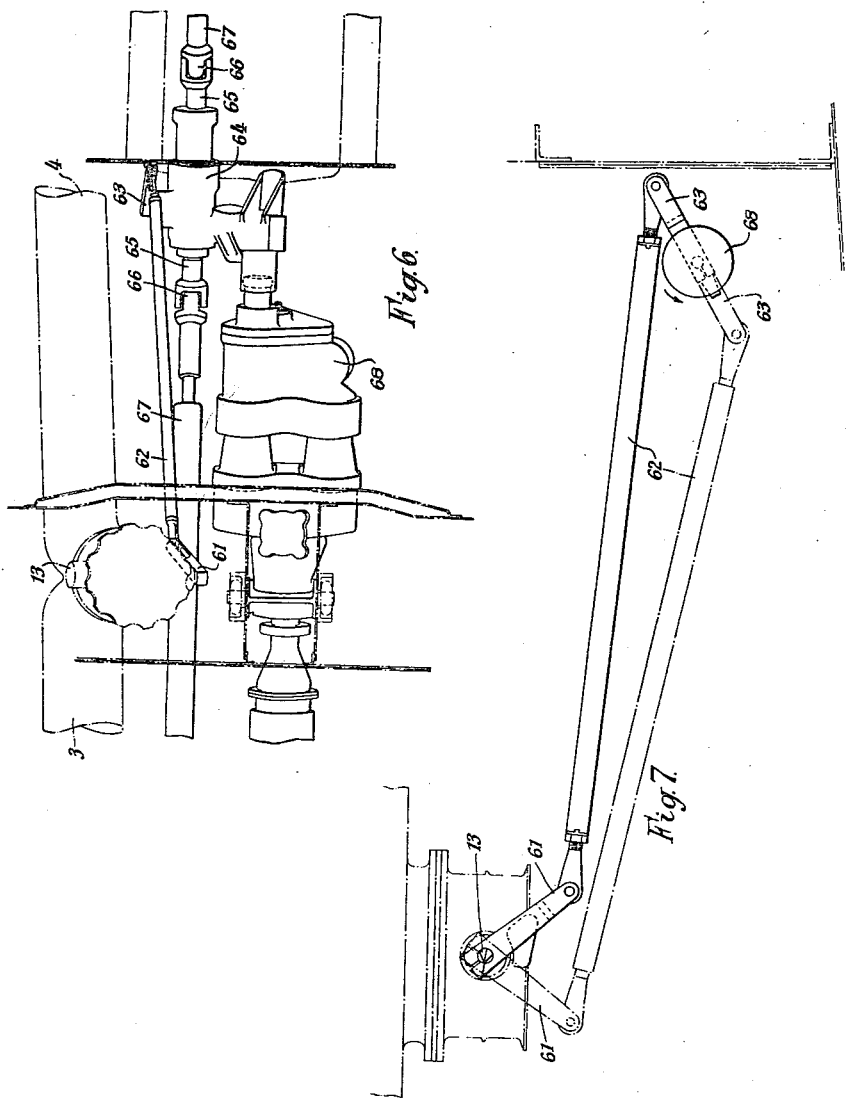

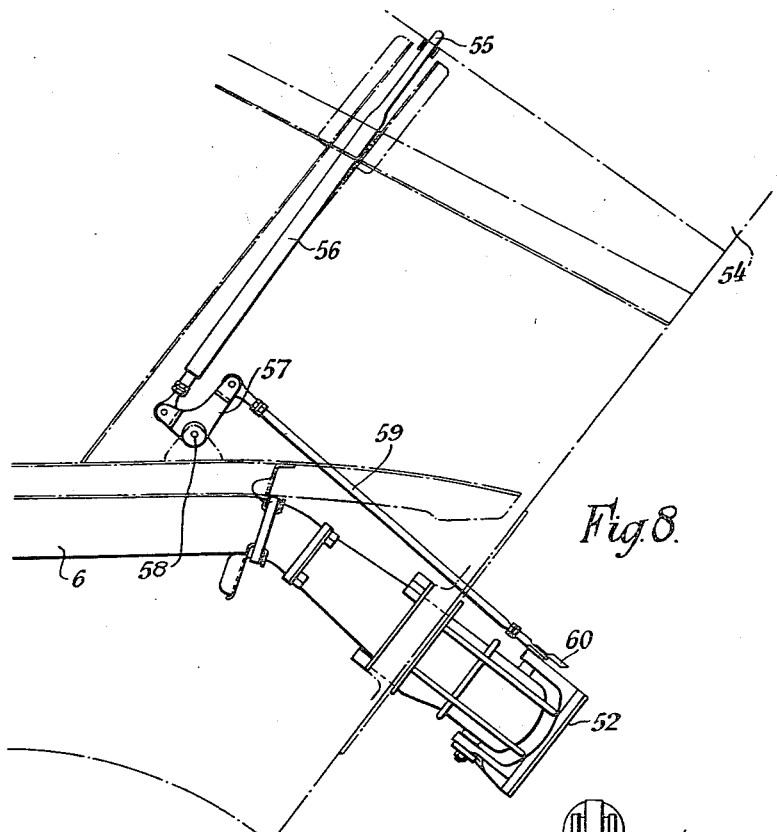
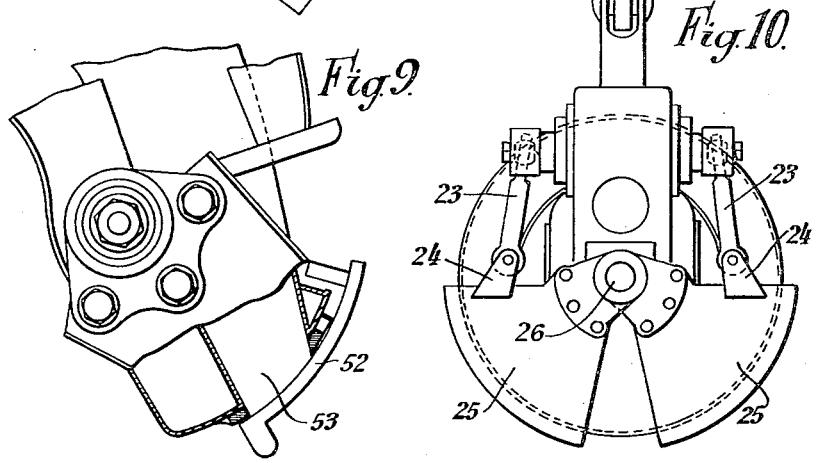

United States Patent Office 3,111,289
Patented Nov. 19, 1963

3,111,289
STABILIZING CONTROL NOZZLE SYSTEMS FOR USE ON AIRCRAFT
Matthew Lee Murphy, Surbiton, England, assignor to Hawker Aircraft Limited, Kingston-upon-Thames, England
Filed Jan. 23, 1961, Ser. No. 84,120
8 Claims. (Cl. 244—52)

This invention relates to stabilizing control nozzle systems for use on aircraft of the vertical take-off and landing type, the phrase being intended to cover fixed wing aircraft which are either capable of taking off and landing vertically or alternatively taking off and landing at a steep angle and at a speed below stalling speed.

The invention is particularly concerned with the type of fixed wing aircraft forming the subject of co-pending patent application Ser. No. 843,302 filed September 29, 1959 which aircraft included a gas turbine mounted within the fuselage, the gas turbine having associated therewith a pair of nozzles situated forward of the centre of gravity and a second pair of nozzles situated aft of the centre of gravity, the nozzles comprising each pair projecting from the fuselage on opposite sides, the forward pair of nozzles discharging air bled from the compressor of the gas turbine, the aft pair of nozzles discharging efflux gases from the turbine, the nozzles being mounted for simultaneous orientation, whereby the whole volume of air and efflux gases discharged from the four nozzles could be directed rearwardly and used for forward propulsion or directed downwardly to produce vertical or otherwise upward lift.

Furthermore it is preferred that the nozzles shall be capable of movement beyond a vertical position in a forward direction, the angular movement of the nozzles being in the region of 100°, whereby the thrust from the nozzles can be directed in a downward and slightly forward direction during the transition stage between forward flight and hovering or downward flight preparatory to landing.

Such an aircraft as is proposed in accordance with the earlier patent application above referred to includes the usual aerodynamic control surfaces, i.e. elevators, rudder and ailerons with which the aircraft is controlled during normal forward flight and with stabilizing nozzles situated at the wing tips, nose and tail for stabilizing the aircraft in the pitching, rolling and yawing planes when the aerodynamic control surfaces are ineffective.

The chief object of the invention is to evolve an improved form of stabilizing control nozzle system for aircraft of the above type with which normal movements of the flight controls will effectively control the aircraft in the pitching, rolling and yawing planes, whether the aircraft is hovering, ascending or descending vertically or at a forward speed below that at which the normal aerodynamic control surfaces would be effective or during normal forward flight conditions above stalling speed.

The invention consists broadly in providing stabilizing control nozzles at the wing tips, nose and tail of an aircraft through which a gas such as air is directed downwardly for stabilizing purposes, the area of the discharge openings of the nozzles being individually variable for controlling the gas discharge and therefore controlling the aircraft in the pitching and rolling planes by means of valves or their equivalents, the fore and aft stabilizing nozzles being angularly movable about horizontal axes in opposite directions for control in the yawing plane, the valves controlling the discharge of the gases being interconnected with the control column and rudder pedals so that normal operation of the flight controls will control the aircraft in the three planes even though the control surfaces are ineffective.

It will be appreciated that such an aircraft will necessarily pass through a transition stage between vertical and normal forward flight and vice versa and in co-pending patent application Ser. No. 85,517 filed January 30, 1961 and now U.S. Patent No. 3,098,628 there is described a form of control for the orientation of the main lift and propulsion nozzles during the transition stage between vertical take-off or take-off at an abnormally steep angle and forward flight, and conversely between forward flight and hovering or downward flight, for example as when landing.

According to a further feature of the invention the supply of air or other gas to the stabilizing nozzles is under the control of a master valve which is automatically opened on the main lift and propulsion nozzles being moved to a determined angular position relative to the horizontal, the valve being automatically closed when the main lift and propulsion nozzles have been moved into a position such that the forward speed of the aircraft will be higher than stalling speed.

In this way the aerodynamic control surfaces and the stabilizing nozzles may be so co-related that they each perform their own function under the conditions of operation for which they are designed and do not each amplify the control effect obtained with each other, thus ensuring that normal movements of the control column and rudder pedals will produce normal movements of the aircraft in the three planes irrespective of whether the aerodynamic control surfaces are or are not effective in a controlling sense.

The valve mechanism controlling the area of discharge of the stabilizing nozzles preferably takes the form of clam type shutters which as a result of pivotal movement control the effective area of the discharge openings.

In the case of the fore and aft mounted discharge nozzles a two part shutter is preferably provided, the parts moving in opposite directions, the nozzle itself having a limited pivotal movement about a horizontal axis, movement of the fore and aft nozzles being in opposite directions so that the gas instead of discharging vertically downwards will discharge downwardly at an angle to the vertical under the control of the rudder pedals to produce a turning moment to move the aircraft in the yawing plane.

The main control valve controlling the supply of gas to the stabilizing nozzles may be actuated by a cam or a dead centre linkage in such a way that the valve is fully open during take-off and until the main lift and propulsion nozzles have reached a pre-determined angle.

With further movement of the main nozzles the valve closes progressively and then remains closed between a second pre-determined angle and the horizontal flight position of the propulsion nozzles.

Before landing the aircraft, the main nozzles are rotated to a vertical position and the valve operating cycle is repeated in reverse to open the valve.

Figure 2:
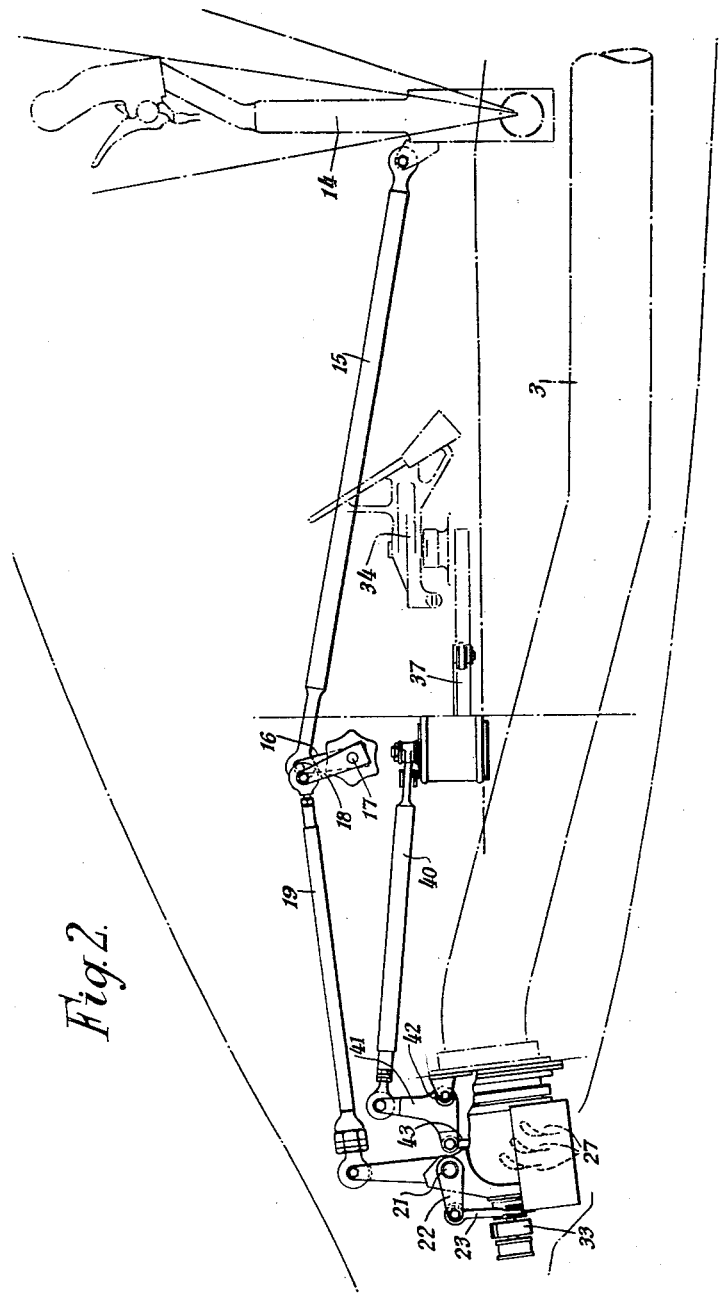
Figure 3:
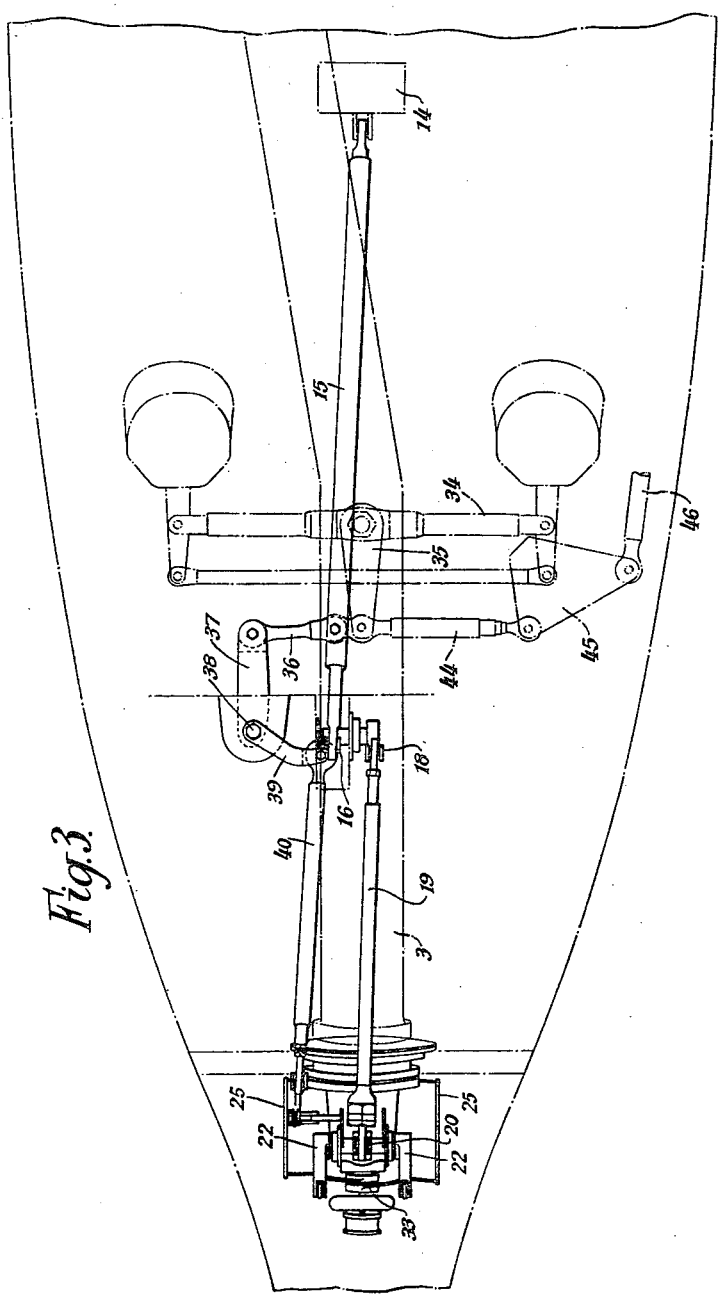

Referring to the accompanying drawings:
FIGURE 1 is a side elevation of an aircraft showing the disposition of the fore and aft stabilizing control nozzles and the master control valve therefor;
FIGURES 2 and 3 are respectively a side elevation and plan of the stabilizing control nozzle associated with the nose of the aircraft and showing its connection with the flight controls;
FIGURES 4 and 5 are similar views of the control nozzle associated with the tail of the aircraft;
FIGURES 6 and 7 are detail views showing the interconnected control mechanism of the master valve and main lift nozzles;
FIGURE 8 is a plan view of the port wing tip stabilizing control nozzle;
FIGURE 9 is a side elevation partly in section; and FIGURE 10 is a front elevation of either the fore or aft control nozzle.

Referring in the first instance to FIGURE 1 which shows diagrammatically the general layout of the fore and aft stabilization control nozzles and their associated mechanism, the control nozzle associated with the nose of the aircraft is indicated by reference numeral 1 and the control nozzle associated with the tail by reference numeral 2.

The fore and aft nozzles 1 and 2 are interconnected by tubular fore and aft ducts 3 and 4, branch ducts 5 and 6 leading to the control nozzles associated with the port and starboard wing tips.

The engine casing is indicated diagrammatically by chain dotted lines and consists of a front casing portion 7 containing one or more large diameter fans, a compressor casing portion 8 and a turbine and bifurcated tail portion 9.

Air is delivered from casing portion 7 to a pair of lift nozzles 10 and the exhaust efflux gases issuing from the turbine are delivered to lift nozzles 11. Lift nozzles 10 and 11 are arranged fore and aft of the centre of gravity of the aircraft and are arranged as pairs projecting from opposite sides of the fuselage. The lift nozzles are capable of simultaneous orientation about their horizontal axes from a position in which they extend rearwardly and horizontally through an angle of approximately 100°, the terminal forward and downwardly directed position producing a braking effect on the aircraft in addition to upward lift.

Ducts 3, 4, 5 and 6 are connected with a main supply connection 12 on the compressor casing 8 containing a butterfly type master control valve by means of which the supply of air to the four control nozzles can be controlled, the spindle of the master valve being indicated by reference numeral 13.

It is proposed to control the discharge of air from the four stabilizing control nozzles by the flight controls, the stabilizing control nozzles and the aerodynamic control surfaces being so co-related that they each perform their own function under the condition of operation for which they are designed and do not each amplify the control effect obtained with each other, thus ensuring that normal movements of the flight controls, i.e. control column and rudder pedals will produce normal movements of the aircraft in the three planes irrespective of whether the control surfaces are or are not effective in a controlling sense.

The manner in which the control nozzles and flight controls are interconnected is shown in FIGURES 2 to 5 and 8 and in addition reference will now also be made to FIGURES 9 and 10.

The control column 14 is connected by means of a link 15 with a lever 16 carried by a shaft 17 revolvable in a suitable fixed bearing, shaft 17 carrying a second lever 18 connected by a second link 19 with a lever 20 carried by a shaft 21 to which is secured two forwardly directed levers 22. Levers 22 are connected by links 23 with arms 24 on a pair of clam type shutters 25 having a common hinge axis 26, the shutters opening and closing in opposite directions as a result of movement of the control column to control the discharge of air from the forward stabilizing nozzle. The construction of this nozzle is more clearly shown in FIGURES 2 and 10. In order to ensure the discharge of air in a downward direction substantially at 90° to the longitudinal axis of the aircraft the nozzle contains a number of deflectors 27.

The general construction of the aft stabilizing nozzle 2 is similar to the forward nozzle, the clam type shutters associated with the two nozzles moving in opposite senses under movement of the control column thus controlling the aircraft in the pitching plane.

Turning now to FIGURE 4 which shows the aft nozzle 2 and its operating mechanism a lever 28 responsive to movement of the elevators under the control of the control column 14 through the usual servo control mechanism, lever 28 being connected via a link 29 with a lever 30 pivoted at 31 and connected by means of a link 32 with the clam type shutters 25 by a similar arrangement of levers to those previously described in connection with the forward control nozzle, the parts therefor bearing similar reference numerals.

To control the aircraft in the yawing plane both fore and aft control nozzles are pivotally mounted about horizontal axes in bearings 33 under the control of the rudder bar.

The rudder bar 34 carries a lever 35 connected via a link 36 to a lever 37 carried by a shaft 38 carrying a second lever 39 to which is connected a link 40 which in turn is connected to a bell crank lever 41 pivoted at 42, bell crank lever 41 being connected by a link 43 with the nozzle casing to turn the latter about its horizontal axis.

Lever 35 is connected by second link 44 with a bell crank lever 45 connected by a link 46 with the rudder actuating mechanism.

The rudder 47 is connected to a lever 48 carried by a shaft 49 in turn carrying a lever 50, the latter being coupled by means of a link 51 with a bell crank and link similar to the forward nozzle which parts are given similar reference numbers, the arrangement being such that the aft nozzle will be turned about its horizontal axis but in the opposite direction to the forward nozzle. In this way the air which would normally discharge vertically downwards will discharge downwardly at an angle to produce a turning movement to move the aircraft in the yawing plane.

Control of the aircraft in the rolling plane is obtained by opening and closing movement of shutters 52 on wing tip nozzles 53 (see FIGURES 8 and 9), shutters 52 on the opposite wing tips being moved in opposite directions as a result of movement of the control column.

The ailerons 54 which are moved in the usual manner by the control column are each connected by way of a lever 55 and link 56 with a toggle lever 57 pivoted at 58, toggle lever 57 being in turn connected by means of a link 59 with a lever 60 on the shaft carrying the shutter 52 to move the latter in front of the mouth of the nozzle 53.

The control mechanism for the delivery of air to the stabilizing nozzles is shown in FIGURES 6 and 7, the shaft 13 of the master butterfly valve carrying a lever 61 which is connected by means of a link 62 with a lever 63 mounted on a shaft in a gear casing 64 from which casing project the ends of a shaft 65 having universal joint connections 66 with further shafts 67. Shafts 67 when rotated produce simultaneous rotational movement of the four lift nozzles 10 and 11 through the medium of chain and sprocket type gearing.

Shaft 65 is driven through an auxiliary gear box by an air motor 68 supplied with air bled from the compressor casing of the engine.

In the full line position of link 62 in FIGURE 7 the master butterfly valve is closed whilst the lift nozzles 10 and 11 are in a rearwardly directed horizontal position for forward flight.

When the link 62 is in the dotted line position the lift nozzles are directed downwardly, the master valve being open to supply air to the stabilizing nozzles in which position the aerodynamic control surfaces will be ineffective. The direction of movement of lever 63 is shown by the arrow in FIGURE 7 and it will be appreciated that as the lift nozzles are moved from a rearwardly directed position towards a downwardly directed position in which they produce a direct lift, the master control valve will be quickly opened during the first part of the movement of lever 63 until it approaches its dead centre position relative to link 62, and the valve will thereafter remain substantially fully open during the remainder of the movement of lever 63 and the lift nozzles.

The master valve when fully open will remain fully open until the lift nozzles are returned to a position in which they give a substantial thrust to the aircraft in a forward direction and the forward speed of the aircraft is such that the control surface once more becomes effective, the master valve then closing.

The stopping and starting of the air motor is preferably under the control of a hand controlled lever in the pilot's cockpit which forms no part of the present invention, the lever having a dash-pot or the like associated with it whereby the lift nozzles will be moved slowly from a downwardly directed position to a rearwardly directed position in which latter position they produce a maximum thrust in a forward direction.

I claim:

1. In an aircraft of the fixed wing type including orientable combined propulsion and lift nozzles for vertical take-off and landing or for use when taking-off or landing at a speed below stalling speed when the normal aerodynamic control surfaces are ineffective, said combined propulsion and lift nozzles being capable of orientation into a position in which they provide thrust for forward flight, the provision of stabilizing control nozzles at the wing tips, nose and tail through which pressurized gas normally provided for the combined propulsion and lift nozzles can be directed downwardly to stabilize the aircraft in the pitching, yawing and rolling planes, means to control the discharge of gas from the respective nozzles which means is interconnected with the controls of the aircraft so that normal operation of the controls will stabilize the aircraft in the three planes whether or not the control surfaces are effective, the supply of gas to the stabilizing nozzles being under the control of a master valve interconnected with the combined propulsion and lift nozzles orientation mechanism in such manner that the stabilizing control nozzles only come into operation under conditions when the normal flight control surfaces would be ineffective in a controlling sense.

2. In an aircraft of the fixed wing vertical takeoff and landing type having pivotally mounted combined lift and propulsion nozzles and control nozzles at the wing tips, nose and tail through which gas such as air can be directed downwardly to control the aircraft in the pitching, yawing and rolling planes when the normal control surfaces are ineffective as during vertical takeoff, vertical landing and when the forward speed of the aircraft is below stalling speed, means connected with the flying controls for selectively controlling the discharge of gas from said control nozzles whereby normal movement of the flying controls will produce normal movements of the aircraft in a controlling sense under conditions when the control surfaces are ineffective, and a master valve interconnected with the combined lift and propulsion nozzles controlling the flow of gas to all the control nozzles, said master valve being opened as a result of the combined lift and propulsion nozzles being moved into a position in which they are directed downwardly to produce a direct upward lift.

3. In an aircraft as claimed in claim 2, wherein said master valve control means includes linkage controlling the opening and closing movement of the master valve in such manner that the valve is fully open when the lift nozzles are directed downwardly at a pre-determined angle as during take-off and landing, the master valve being progressively closed as the angle of the nozzles to the horizontal is progressively decreased, the master valve being closed and remaining closed between a second predetermined angle of the nozzles to the horizontal and their horizontal flight position in which they no longer produce a direct upward lift.

4. In an aircraft as claimed in claim 2 wherein said master valve control means includes a suitably driven auxiliary gear box, said gear box driving means for orientating the combined lift and propulsion nozzles and a link having a link connection with a link operatively associated with the master valve, the link connection being such that the master valve is closed throughout a predetermined angle of movement of the lift combined lift and propulsion nozzles and is progressively opened as the combined lift and propulsion nozzles assume a position in which they directly contribute to the lift and the forward speed of the aircraft is such that the normal control surfaces cease to be effective in the stabilizing of the aircraft in the three planes.

5. A stabilizing system for use in an aircraft as claimed in claim 2 wherein the discharge of gas from said control nozzles is controllable by means of hinged shutters movable in front of the mouths of the control nozzles.

6. A stabilizing system for use in an aircraft as claimed in claim 2 wherein the control nozzles associated with the nose and tail of the aircraft are each fitted with a pair of shutters pivotally mounted for movement in opposite directions to control the quantity of gas discharged, movement of the shutters of the forward nozzle being opposite to the movement of the aft nozzle.

7. A stabilizing system for use in an aircraft as claimed in claim 2 wherein each control nozzle includes a series of curved guide bores for directing the gas vertically downwardly during its discharge.

8. An aircraft of the fixed wing vertical takeoff and landing type and including a fuselage having a nose and a wing having wing tips, a fixed pressurized gas producing power unit mounted within said fuselage, movable combined lift and propulsion nozzles connected to said power unit for directing pressurized gases to selectively provide for lift and propulsion, control nozzles at the wing tips, nose and tail through which certain of pressurized gases can be directed downwardly to control the aircraft in the pitching, yawing and rolling planes when the normal control surfaces are ineffective as during vertical takeoff, vertical landing and when the forward speed of the aircraft is below stalling speed, means connected with the flying controls for selectively controlling the discharge of gas from said control nozzles whereby normal movement of the flying controls will produce normal movements of the aircraft in a controlling sense under conditions when the control surfaces are ineffective, and a master valve interconnected with the combined lift and propulsion nozzles controlling the flow of gas to all the control nozzles, said master valve being opened as a result of the combined lift and propulsion nozzles being moved to a position in which they are directed downwardly to produce a direct upward lift.

References Cited in the file of this patent

UNITED STATES PATENTS 2,959,374    Laskowitz _____ Nov. 8, 1960

FOREIGN PATENTS 327,580    Switzerland _____ Mar. 15, 1958
806,030    Great Britain _____ Dec. 17, 1958

OTHER REFERENCES

Flight, June 10, 1960, pages 793–799.